(12) United States Patent
Harbour et al.

(10) Patent No.: US 12,511,761 B2
(45) Date of Patent: Dec. 30, 2025

(54) OBJECT IDENTIFICATIONS IN IMAGES OR VIDEOS

(71) Applicant: HINGE HEALTH, INC., San Francisco, CA (US)

(72) Inventors: Louis Harbour, Montreal (CA); Bahareh Bafandeh Mayvan, Montreal (CA); Colin Joseph Brown, Saskatoon (CA); Jeffrey Rainy, Montreal (CA)

(73) Assignee: Hinge Health, Inc., San Francisco, CA (US)

( * ) Notice: Subject to any disclaimer, the term of this patent is extended or adjusted under 35 U.S.C. 154(b) by 284 days.

(21) Appl. No.: 18/216,846

(22) Filed: Jun. 30, 2023

(65) Prior Publication Data

US 2023/0351615 A1    Nov. 2, 2023

Related U.S. Application Data

(63) Continuation of application No. PCT/IB2021/050022, filed on Jan. 4, 2021.

(51) Int. Cl.
| | |
|---|---|
| *G06T 7/246* | (2017.01) |
| *G06T 7/12* | (2017.01) |
| *G06V 10/26* | (2022.01) |
| *G06V 10/82* | (2022.01) |
| *G06V 40/10* | (2022.01) |

(52) U.S. Cl.
CPC .............. *G06T 7/246* (2017.01); *G06T 7/12* (2017.01); *G06V 10/273* (2022.01); *G06V 10/82* (2022.01); *G06V 40/10* (2022.01); *G06T 2207/10016* (2013.01); *G06T 2207/20084* (2013.01); *G06T 2207/30196* (2013.01); *G06T 2207/30221* (2013.01)

(58) Field of Classification Search
None
See application file for complete search history.

(56) References Cited

U.S. PATENT DOCUMENTS

| 8,971,575 | B2 | 3/2015 | Chang et al. |
| 9,659,364 | B2* | 5/2017 | Pekar ............... G06T 7/0012 |
| 9,972,092 | B2* | 5/2018 | Lin ..................... G06T 7/11 |

(Continued)

FOREIGN PATENT DOCUMENTS

JP    02-059977 A    2/1990

OTHER PUBLICATIONS

Associative Embedding: Ent-to-End Learning for Joint Detection and Grouping. Newell et al. (Year: 2017).*

(Continued)

*Primary Examiner* — Delomia L Gilliard
(74) *Attorney, Agent, or Firm* — Perkins Coie LLP; Andrew T. Pettit (57) ABSTRACT

An apparatus is provided. The apparatus includes a communications interface to receive raw data from an external source. The raw data includes a representation of a first object and a second object. The apparatus further includes a memory storage unit to store the raw data. In addition, the apparatus includes a neural network engine to receive the raw data. The neural network engine is to generate a segmentation map and a boundary map. The apparatus also includes a post-processing engine to identify the first object and the second object based on the segmentation map and the boundary map.

16 Claims, 9 Drawing Sheets

(56) References Cited

U.S. PATENT DOCUMENTS

2018/0374233 A1* 12/2018 Zhou .................. G06F 18/22
2020/0272888 A1* 8/2020 Wang .................. G06V 40/103

OTHER PUBLICATIONS

Newell, Alejandro, et al., "Associative Embedding: End-to-End Learning for Joing Detection and Grouping", Retrieved from the Internet at url: https://arxiv.org/pdf/1611.05424.pdf; XP055611461, Jun. 9, 2017, pp. 1-11.

Takikawa et al., Gated-SCNN: Gated Shape CNNs for Semantic Segmentation, 2019 IEEE/CVF International Conference on Computer Vision (Iccv), IEEE, Feb. 27, 2020, https://ieeexplore.IEEE.org/document/9009833 - 12 pages.

* cited by examiner

OBJECT IDENTIFICATIONS IN IMAGES OR VIDEOS

CROSS-REFERENCE TO RELATED APPLICATION(S)

This application is a continuation of International Patent Application No. PCT/IB2021/050022, filed on Jan. 4, 2021 and titled "OBJECT IDENTIFICATIONS IN IMAGES OR VIDEOS", which is incorporated herein by reference in its entirety.

BACKGROUND

Object identifications in images may be used for multiple purposes. For example, objects may be identified in an image for use in other downstream application. In particular, the identification of an object may be used for tracking the object, such as a player on a sport field, to follow the players motions and to capture the motions for subsequent playback or analysis.

The identification of objects in images and videos may be carried out with methods such as edge-based segmentation detection and other computer vision methods. Such methods may be used to separate objects, especially people, in images for application in three-dimensional reconstruction, object-centric scene understanding, surveillance, and action recognition.

BRIEF DESCRIPTION OF THE DRAWINGS

Reference will now be made, by way of example only, to the accompanying drawings in which.

DETAILED DESCRIPTION

As used herein, any usage of terms that suggest an absolute orientation (e.g. "top", "bottom", "up", "down", "left", "right", "low", "high", etc.) may be for illustrative convenience and refer to the orientation shown in a particular figure. However, such terms are not to be construed in a limiting sense as it is contemplated that various components will, in practice, be utilized in orientations that are the same as, or different than those described or shown.

Object identifications in images may be used for multiple purposes. For example, objects may be identified in an image for use in other downstream application. In particular, the identification of an object may be used for tracking the object, such as a player on a sport field, to follow the player's motions and to capture the motions for subsequent playback or analysis.

Edge-based segmentation detection and other computer vision methods may be used to identify objects in images. However, these methods generally do not perform well identifying objects when fragmented parts are visible as these methods have difficulty creating of meaningful objects and instances from the fragmented parts. Accordingly, the detection of separated figure-ground human instance segmentations in real-world environments may be challenging due to complicated occlusion patterns, varying body proportions and clothing.

An apparatus and method of predicting segmentation in complicated images with multiple objects is provided to identify target objects in the image. The apparatus uses a neural network to predict a boundary map and then a post-processing engine combines encoded maps to provide an instance segmentation. The apparatus and method can provide accurate object instance segmentation frameworks in complex images with heavy occlusion areas. For example, the apparatus may automatically cluster all of the related parts of an object, such as a human (including but not limited to hands, legs, torso, head), after applying the boundary map on the input image. Furthermore, the apparatus and method are able to dynamically adapt based on the characteristics of the input image to provide improved object instance segmentations in a complex scene both in terms of the number and the quality of detections.

In the present description, the models and techniques discussed below are generally applied to a person. It is to be appreciated by a person of skill with the benefit of this description that the examples described below may be applied to other objects as well such as animals and machines.

Figure 1:
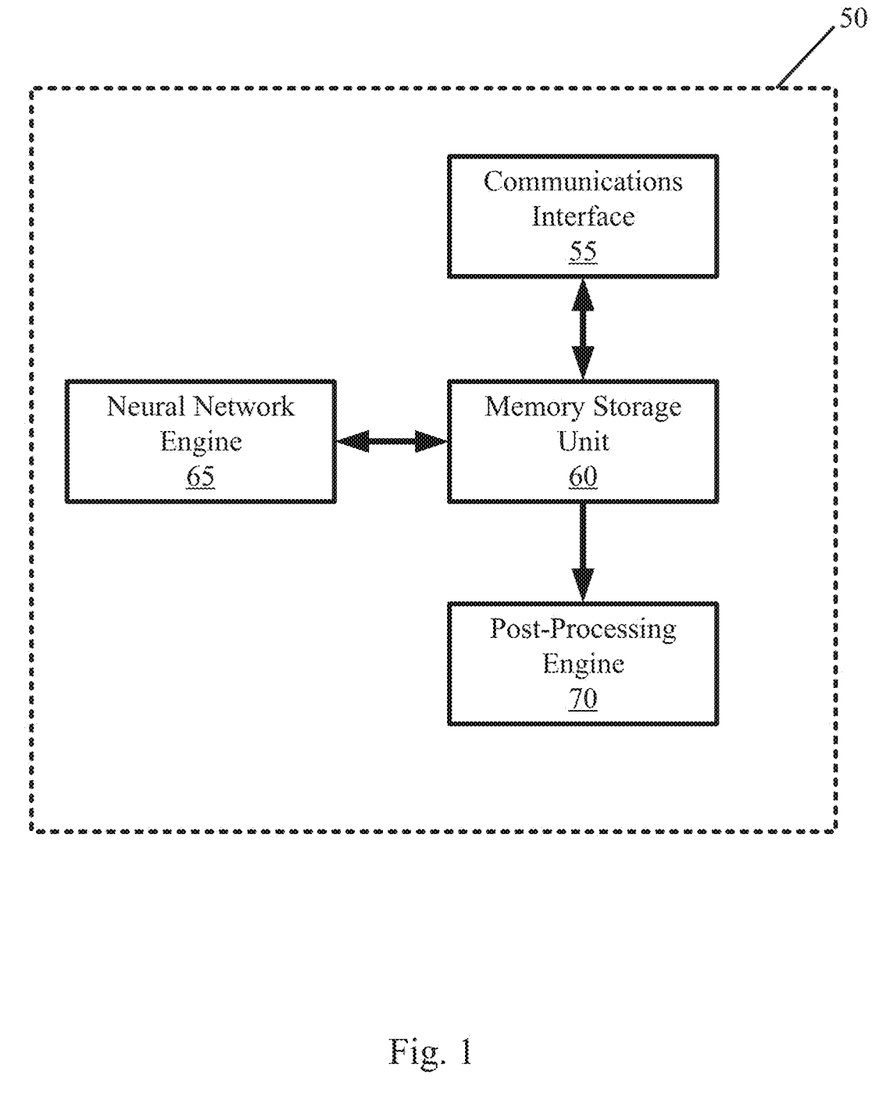
FIG. 1 is a schematic representation of the components of an example apparatus to generate object instance segmentations based on fragment clustering and rediscovery.

Referring to FIG. 1, a schematic representation of an apparatus to generate object instance segmentation in complex images based on fragment clustering and rediscovery is generally shown at 50. The apparatus 50 may include additional components, such as various additional interfaces and/or input/output devices such as indicators to interact with a user of the apparatus 50. The interactions may include viewing the operational status of the apparatus 50 or the system in which the apparatus 50 operates, updating parameters of the apparatus 50, or resetting the apparatus 50. In the present example, the apparatus 50 is to receive raw data, such as a standard RGB image, and to process the raw data to generate output that identifies objects, such as a person. The output is not particularly limited and may include a segmentation map or a skeleton. In the present example, the apparatus 50 includes a communications interface 55, a memory storage unit 60, a neural network engine 65, and a post-processing engine 70.

The communications interface 55 is to communicate with an external source to receive raw data representing an object in a complex image. Although the raw data received by the communications interface 55 may not represent a complex image in some instances, it is to be appreciated that the apparatus 50 is generally configured to handle complex images which are typically a challenge to handle due to occlusions of the object in the image. The occlusions are not limited and in some cases, the image may include many objects such that the objects occlude each other. In other examples, the object may involve occlusions caused other features that are not to be segmented or identified.

In the present example, the raw data may be a two-dimensional image of the object. The manner by which an object is represented and the exact format of the two-dimensional image is not particularly limited. In the present example, the two-dimensional image may be received in an RGB format. It is to be appreciated by a person of skill in the art with the benefit of this description that the two-dimensional image be in a different format, such as a raster graphic file or a compressed image file captured and processed by a camera.

The manner by which the communications interface 55 receives the raw data is not limited. In the present example, the communications interface 55 communicates with external source over a network, which may be a public network shared with a large number of connected devices, such as a WiFi network or cellular network. In other examples, the communications interface 55 may receive data from an external source via a private network, such as an intranet or a wired connection with other devices. In addition, the external source from which the communications interface 55 receives the raw data is not limited to any type of source. For example, the communications interface 55 may connect to another proximate portable electronic device capturing the raw data via a Bluetooth connection, radio signals, or infrared signals. As another example, the communications interface 55 is to receive raw data from a camera system or an external data source, such as the cloud. The raw data received via the communications interface 55 is generally to be stored on the memory storage unit 60.

In another example, the apparatus 50 may be part of a portable electronic device, such as a smartphone, that includes a camera system (not shown) to capture the raw data. Accordingly, in this example, the communications interface 55 may include the electrical connections within the portable electronic device to connect the apparatus 50 portion of the portable electronic device with the camera system. The electrical connections may include various internal buses within the portable electronic device.

Furthermore, the communications interface 55 may be used to transmit results, such segmentation map and/or a plurality of skeletons that may be generated to segment the objects in the original image. For example, the communications interface 55 may be in communication with an animation engine (not shown) which may be part of the apparatus 50 or on a separate device. Accordingly, the apparatus 50 may operate to receive raw data from an external source representing multiple object with complex occlusions to be segmented.

The memory storage unit 60 is to store the raw data received via the communications interface 55. In particular, the memory storage unit 60 may store raw data including two-dimensional images representing objects with complex occlusions to be segmented and/or tracked. In the present example, the memory storage unit 60 may be store multiple two-dimensional images representing different objects in as frame of a video. Accordingly, the raw data may be video data representing the movement of various objects in the image. As a specific example, the objects may be images of people having different sizes and may include the people in different poses showing different joints and having some portions of the body occlude other joints and portions of the body. For example, the image may be of sport scene where multiple players are captured moving about in normal game play. It is to be appreciated by a person of skill that in such a scene, each player may occlude another player. In addition, other objects, such as a game piece or arena fixture may further occlude the players. Although the present examples relate to a two-dimensional image of one or more humans, it is to be appreciated with the benefit of this description that the examples may also include images that represent different types of objects, such as an animal or machine. For example, the image may represent an image capture of a grassland scene with multiple animals moving about or of a racetrack where multiple cars are driving around a track.

The memory storage unit 60 may be also used to store addition data to be used by the apparatus 50. For example, the memory storage unit 60 may store various reference data sources, such as templates and model data, to be used by the neural network engine. It is to be appreciated that the memory storage unit 60 may be a physical computer readable medium used to maintain multiple databases, or may include multiple mediums that may be distributed across one or more external servers, such as in a central server or a cloud server.

In the present example, the memory storage unit 60 is not particularly limited includes a non-transitory machine-readable storage medium that may be any electronic, magnetic, optical, or other physical storage device. As mentioned above, the memory storage unit 60 may be used to store information such as data received from external sources via the communications interface 55, template data, training data, results from the neural network engine 65, and/or results from the post-processing engine 70. In addition, the memory storage unit 60 may be used to store instructions for general operation of the apparatus 50. The memory storage unit 60 may also store an operating system that is executable by a processor to provide general functionality to the apparatus 50 such as functionality to support various applications. The memory storage unit 60 may additionally store instructions to operate the neural network engine 65 and the post-processing engine 70. Furthermore, the memory storage unit 60 may also store control instructions to operate other components and any peripheral devices that may be installed with the apparatus 50, such cameras and user interfaces.

The memory storage unit 60 may be preloaded with data or instructions to operate components of the apparatus 50. In other examples, the instructions may be loaded via the communications interface 55 or by directly transferring the instructions from a portable memory storage device connected to the apparatus 50, such as a memory flash drive. In other examples, the memory storage unit 60 may be an external unit such as an external hard drive, or a cloud service providing content.

The neural network engine 65 is to receive or retrieve the raw data stored in the memory storage unit 60. In the present example, the neural network engine 65 uses the raw data representing an image (FIG. 2) to generate output data, which may include a segmentation map, a boundary map, a bone heatmap, and a joint heatmap. It is to be appreciated that the neural network engine 65 may generate multiple joint heatmaps, such as one for each type of joint. Similarly, the neural network engine 65 may generate multiple bone heatmaps, where each map represents a bone type connecting joints. It is to be appreciated by a person of skill in the art with the benefit of this description that the terms "joint" and "bone" refer to various reference points in a person that may be modeled with a range of motion to represent an approximation of the reference points on a person. For example, a joint may refer to a reference point on a person that is not a physiological joint, such as an eye. In other examples, a joint may refer to a reference point with multiple physiological bone joints, such as a wrist or ankle. Similarly, a bone may refer to a connection between joints as described herein.

Figure 2:
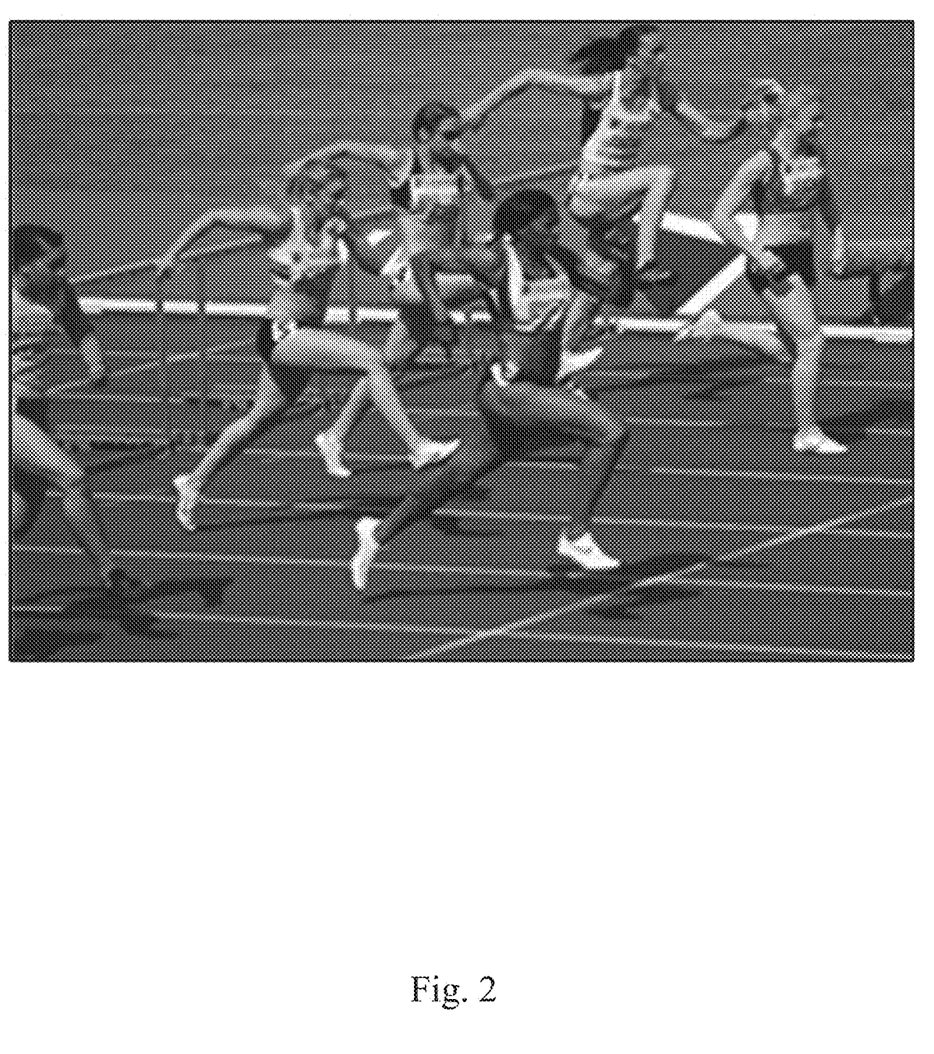
FIG. 2 is an example of raw data representing an image received at the apparatus of FIG. 1.

The image shown in FIG. 2 represents a scene from a race where the objects to be identified are the people participating in the race. It is to be appreciated by a person of skill with the benefit of this description that the scene is complicated with various portions of people occluding portions of other people.

The manner by which the neural network engine 65 processes the raw data to generate the segmentation map and the boundary map is not particularly limited. In the present example, the raw data may include an image of a plurality of objects. To illustrate the operation of the neural network engine 65, the raw data may be rendered to provide the image shown in FIG. 2. It is to be appreciated that FIG. 2 may be in color. In this specific example, the plurality of objects of the raw data represents a photograph of participants in a race. The raw data is an RGB image which may be represented as three superimposed maps for the intensity of red color, green color, and blue color. It is to be appreciated that in other examples, the raw data may not be in RGB image format. For example, the raw data may be in a format such as a raster graphic file or a compressed image file captured and pre-processed to be converted to RGB format prior to being received by the neural network engine 65. Alternatively, the neural network engine 65 may be configured to receive and handle additional type of image formats.

Figure 3:
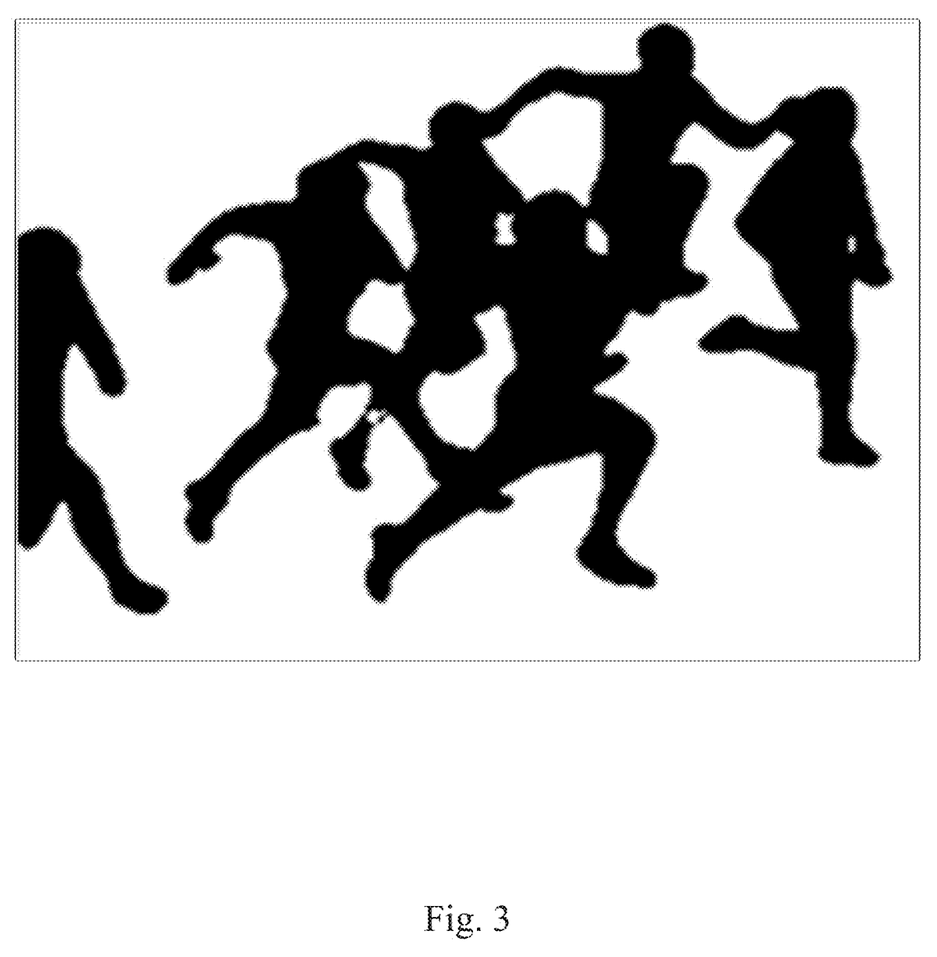
FIG. 3 is a segmentation map of the objects in the image of FIG. 2.

Referring to FIG. 3, an example of a segmentation map of the image of FIG. 2 generated by the neural network engine is shown. The segmentation map is a two-dimensional map having a binary value for each pixel to indicate whether the pixel is part of an object. In the present example, the objects in the raw data are the humans that are participating in the race. The manner by which the neural network engine 65 generates the segmentation map is not particularly limited and may include applying a computer vision-based human pose and segmentation system such as the wrnchAI engine. In other examples, other types of computer vision-based human segmentation systems may be used such as Open-Pose, Mask-R CNN, or other depth sensor, stereo camera or LIDAR-based human segmentation systems such as Microsoft Kinect or Intel RealSense. In addition, the segmentation map may be annotated by hand with an appropriate software such as CVAT or in a semi-automated way with segmentation assistance tools such as those in Adobe Photoshop or GIMP.

In this present example where the raw data shown in FIG. 2 is processed by the neural network engine, the neural network engine 65 generates a segmentation map that shows a green screen projection of the participants in a race. It is to be appreciated by a person of skill with the benefit of this description that the green screen projection is not able to differentiate between two or more occluded objects, such as the participants in the scene. Instead, the segmentation maps indicates the presence of an object, which in this specific example is a human participant in the race, or indicates the absence of the object for each pixel. The presence of an object is represented by a binary value of zero or one. The neural network engine 65 may use a predetermined threshold probability value to determine whether the value for the pixel in the segmentation map is to be one or zero.

Furthermore, the segmentation map and joint heatmap may provide statistics to address occluded portions of the objects in the raw data. As shown in FIG. 3, various body parts of the people that may be overlap and occlude other body parts. The regions of overlap may provide information to characterize the overlap to assist in the generation of the boundary map. In particular, the overlapped portions may provide statistics that can be used to determine which human is overlapping another human in the image. For example, the statistics may include information such as the number and kind of joints present in the overlapping region. In particular, visible joints of an upper-body may indicate that the person is in front compared to another person where only face joints are visible. The extraction of the statistics from the raw data is not particularly limited. In the present example, the neural network engine 65 may identify regions of interest, such as where multiple objects, such as regions where humans are present as identified in the segmentation map. By identifying a region of interest, the computational resources used to obtain the statistics from the raw data may be reduced.

It is to be appreciated by a person of skill in the art with the benefit of this description that multiple regions of interest may be identified by the neural network engine 65. The regions of interest may be classified as single-object regions or multi-object regions. For regions that are classified as single-object, no further processing is carried out as an object is fully identified in the region of interest. For regions that are classified as multi-object, further processing may be carried out to separate instance segmentations in the multi-object regions. In the present example, the manner by which the neural network engine 65 classifies the regions of interest on people involves using information from joint heatmaps as applied to the segmentation map. In other examples where the object may not be a human, the neural network engine 65 may use an appropriate substitute heatmaps.

Figure 4:
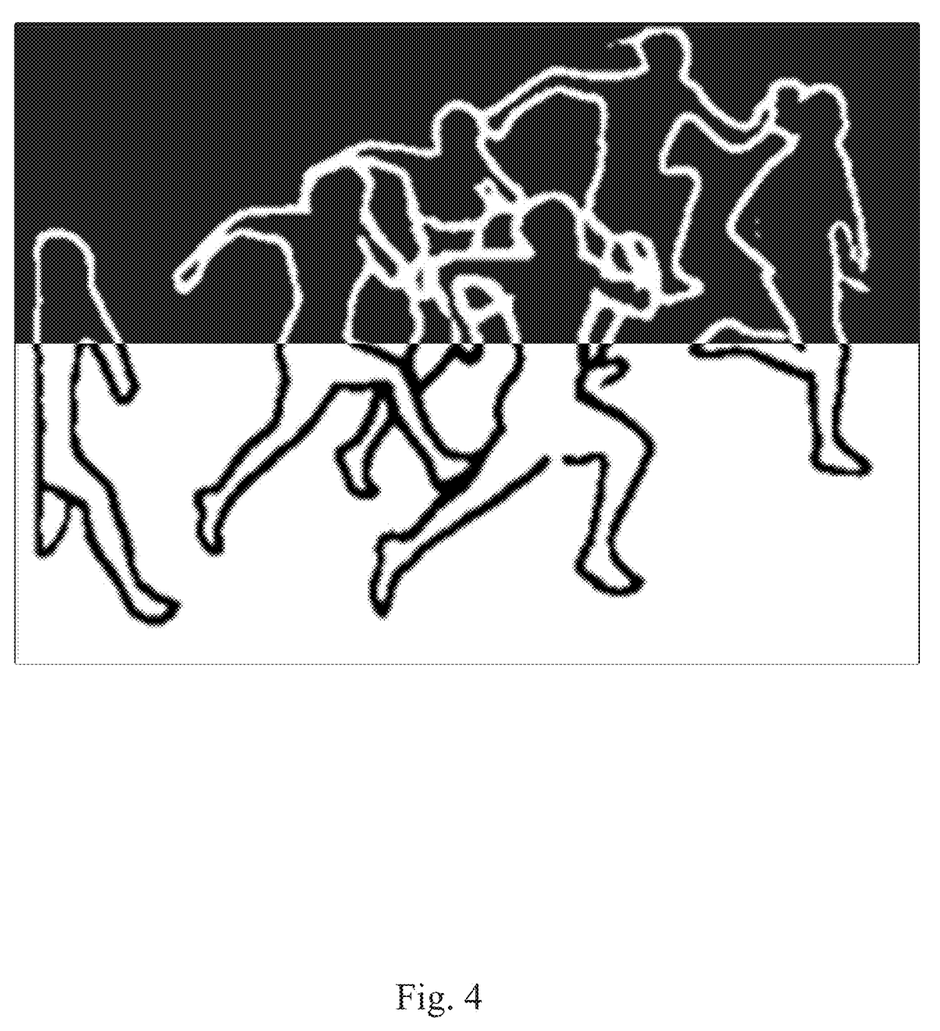
FIG. 4 is a boundary map of the objects in the image of FIG. 2.

Referring to FIG. 4, an example of a boundary map of the image of FIG. 2 is shown. The boundary map is a two-dimensional map generated by the neural network engine 65 to divide the objects in the raw data. In this specific example, the boundary map divides the different people in the race. The manner by which the boundary map is generated is not particularly limited. In the present example, the post-processing engine 70 may use a segmentation map to select appropriate parameters automatically to refine the boundary map generated by the neural network 65. For example, the segmentation map may suggest that the raw data includes images of objects of different sizes, such as larger or smaller objects that may not be detected in the refined boundary map. With the knowledge of objects being in the background and foreground of the two-dimensional raw data, the parameters used by the post-processing engine 70 to refine the boundary map may be selected such that the larger and smaller objects are not excluded.

The boundary map generated by the neural network engine 65 may include a probability map for each pixel that is associated with a likelihood of being a boundary. Therefore, the boundary map generated by the neural network engine 65 may not be clear and/or may not provide a sharp object boundary for portions of the raw data where the neural network engine 65 is unable to determine a clear boundary. In the present example, the neural network engine 65 may also generate a binary boundary map as shown in FIG. 4, where each pixel is assigned a binary value of zero or one. The generation of a binary boundary map may be carried out by applying a predetermined threshold to the pixels such that each pixel with a value above the threshold for the pixel is to be assigned a value of one and each pixel with a value below the threshold for the pixel is to be assigned a value of zero. The boundary map may also be further refined by the post-processing engine 70 by adjusting the kernel size. Accordingly, the post-processing engine 70 may adjust the threshold value and the kernel size to generate closed boundaries with thin defined lines.

The post-processing engine 70 is to identify the objects in the raw data based on the segmentation map, the boundary map, the joint heatmap(s), and the bone heatmap(s) generated by the neural network engine 65. In particular, the post-processing engine 70 is to separate instances of the different objects, such as different humans, in the image represented by the raw data to generate identification data. The identification data generated by the post-processing engine 70 is not limited and may include a plurality of skeletons with unique identifiers.

In the present example, the post-processing engine 70 identifies fragments of the objects in the raw data. Fragments in the raw data arise from occlusions between the objects that may cut off certain portions. In the example above where the objects are humans participating in a race as shown in FIG. 2, the occlusions occur when a body part covers a portion of another, such as a leg in front of another leg. In this example, the leg in the background may be separated into a fragments on either side of the leg in the foreground. Each of the fragments may then be identified, such as a torso, upper leg, foot, hand, arm, etc., in the case where the object is a human.

It is to be appreciated by a person of skill with the benefit of this description that not all fragments of the object may be identified by the post-processing engine 70. Continuing with the present example of humans as the object, the post-processing engine 70 may detect for known missing fragments of a human. In particular, a map of main fragments may be compared with subsequent maps to determine if any fragments are missing. If a fragment is missing, it may be an indication that an object may not have been detected. Accordingly, the post-processing engine 70 may adjust the parameters to apply to the segmentation map and the boundary map from the neural network engine 65.

After the identification of the fragments, the post-processing engine 70 selects a group of fragments to cluster together as belong to the same object. In the present example, the post-processing engine 70 may apply the boundary map on the segmentation map to identify the fragments, which are segments of human instances, such as a torso, upper leg, foot, hand, arm, etc. The fragments are then associated with other fragments from the same object by the post-processing engine 70 using a clustering process. The manner by which the post-processing engine 70 clusters the fragments to associate fragments with a single instance is not particularly limited. In the present example, the post-processing engine 70 may use bone heatmaps, joint heatmaps, or a combination of bone and joint heatmaps to cluster the fragments and to associate the fragments with an object in the image. The precise manner by which the post-processing engine 70 uses the bone heatmaps and the joint heatmaps is not particularly limited. For example, a bone heatmap may be used to identify connections between fragments in an image. In addition, the fragments may also be assigned one or more joint types, such as hand, foot, ankle, hip, etc. It is to be appreciated by a person of skill with the benefit of this description that for human objects, each object is to have no more than a single joint of each type, such as a left hand. Accordingly, after the application of the bone heatmap, the remaining fragments may clustered together such that there are no common joint types in each cluster.

Figure 5:
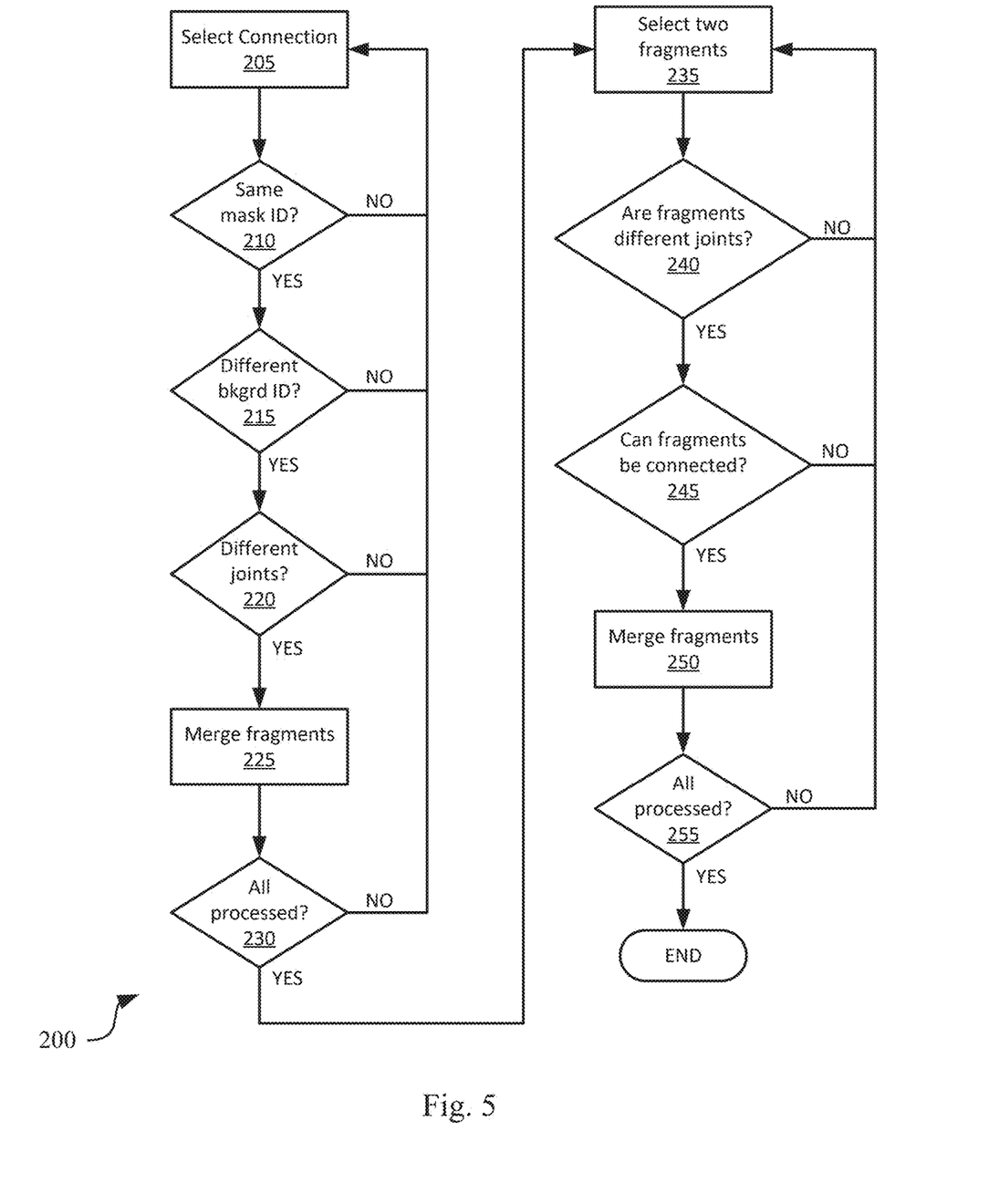
FIG. 5 is a flowchart of an example of a method processing identified fragments.

Referring to FIG. 5, a flowchart of an example method of clustering fragments is shown at 200 carried out by the post-processing engine 70. It is to be appreciated that the method 200 is an example and that other clustering processes may be implemented by the post-processing engine 70. The following discussion and exemplary method 200 may provide a further understanding of the post-processing engine 70 and its function within the apparatus 50. In addition, it is to be emphasized that the method 200 may not be performed in the exact sequence as shown, and that various blocks may be performed in parallel rather than in sequence or in a different sequence altogether. Furthermore, due to the iterative nature of the method 200, all blocks may be simultaneously executing.

Beginning at block 205, a connection between two fragments is selected. Each pair of fragments identified in the raw data is selected in sequence and the order by which they are selected is not particularly limited. In the present example, the order may be selected based on information from the joint heatmaps and the bone heatmaps. In other examples, all possible fragment combinations may be selected in sequence from one side of the image to the opposite side. In the present example, each fragment is assigned a unique identifier (mask ID) to the fragment are generated. Furthermore, connected fragments are assigned the same mask ID, and independent fragments are assigned unique mask ID's. Fragments may also be classified with a unique identifier (background ID) to indicate that it is part of the background instead of the foreground, such as when it falls on pixels outside of the segmentation map (i.e. zero value pixel in the segmentation map). In the present example, the fragments that are part of the background will not be considered. Once a pair of fragments is selected, the process moves to block 210 where the mask ID of each fragment is compared to determine if they are the same. In the case that the mask ID for each fragment is different, the method 200 returns to block 205 to select another connection between different fragments. If the mask ID of the two fragments selected at block 205 are the same, the method 200 proceeds to block 215 where the mask ID is compared with the background ID. In the case that the mask ID is a background ID, the method 200 returns to block 205 to select another connection between different fragments. If the mask ID of the two fragments selected at block 205 is not a background ID, the method 200 proceeds to block 220 where the fragments are analyzed by the post-processing engine 70 to determine if they have the same joint type. In the case where the post-processing engine 70 determines that the fragments include the same joint, the fragments are considered to be different human instances and the method 200 returns to block 205 to select another pair of fragments. Alternatively, if the fragments are determined to have different joint types, the method 200 moves to block 225 where the fragments are merged. In the present example, block 225 merges the smaller fragment into the larger fragment, but in other examples, the opposite may occur if the smaller fragment represented a joint that is considered to be more important than the larger fragment. After merging the fragments, the method 200 proceeds to block 230 where the post-processing engine 70 determines if all fragment pairs have been processed. In the case there are more fragment pairs to be processed, the method 200 returns to the block 205 and continues to iterate.

Upon completion of the processing of connections of joints to generate clusters, the method 200 proceeds to block 235 where two unclustered fragments are selected. The method 200 proceeds to block 240 to determine whether the fragments selected at block 235 have a same joint type. In the case where the post-processing engine 70 determines that the fragments include the same joint, the fragments are considered to be different human instances and the method 200 returns to block 235 to select another pair of unclustered fragments. Alternatively, if the fragments are determined to have different joint types, the method 200 moves to block 245. In block 245, the post-processing engine 70 determine if the fragments selected by block 235 can be connected of if there is not any other non-clustered fragment in the connection path. In the event that the fragments cannot be connected without another non-clustered fragment on the path between the two selected at block 235, the method 200 proceeds back to block 235 where two other non-clustered fragments are selected. If the fragments selected at block 235 can be connected without another fragment on the path, the method 200 moves to block 250 where the post-processing engine 70 merges the smaller fragment into the larger fragment in the present example. After merging the non-clustered fragments, the method 200 proceeds to block 255 where the post-processing engine 70 determines if all non-clustered fragment pairs have been processed. In the case there are more fragment pairs to be processed, the method 200 returns to the block 235 and continues to iterate.

After clustering the object fragments, the objects in image represented in the raw data as shown in FIG. 2 may be separated into separate instances. The separated objects may then be used to generate output data for downstream services. In the present example, the objects are human and once the human instances are separated, the output data may include an instance segmentation map using different shading to identify each human instance. In other examples, skeletons, meshes, or outlines may be rendered to represent the different human instances.

Figure 6:
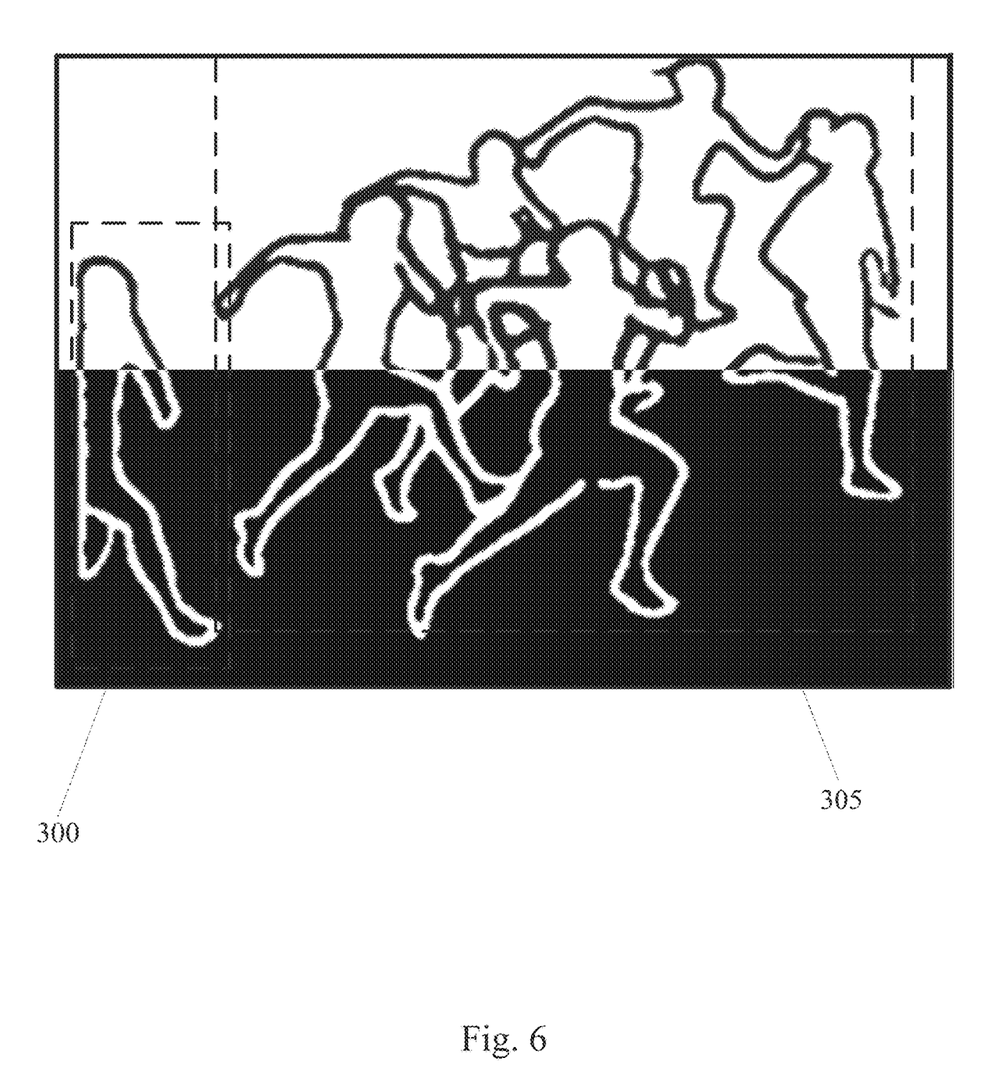
FIG. 6 is a boundary map of the objects in the image of FIG. 2 showing regions of interest.

It is to be appreciated that in some examples, the post-processing engine 70 may improve computational efficiency by processing only regions of interest in the segmentation map and the boundary map as identified by the neural network engine 65. Referring to FIG. 6, the region 300 having a single object boundary and a region 305 having a multi-object boundary are shown. In this example, the post-processing engine 70 may be configured to focus on the region 305 having a multi-object boundary to save computational resources.

Figure 7:
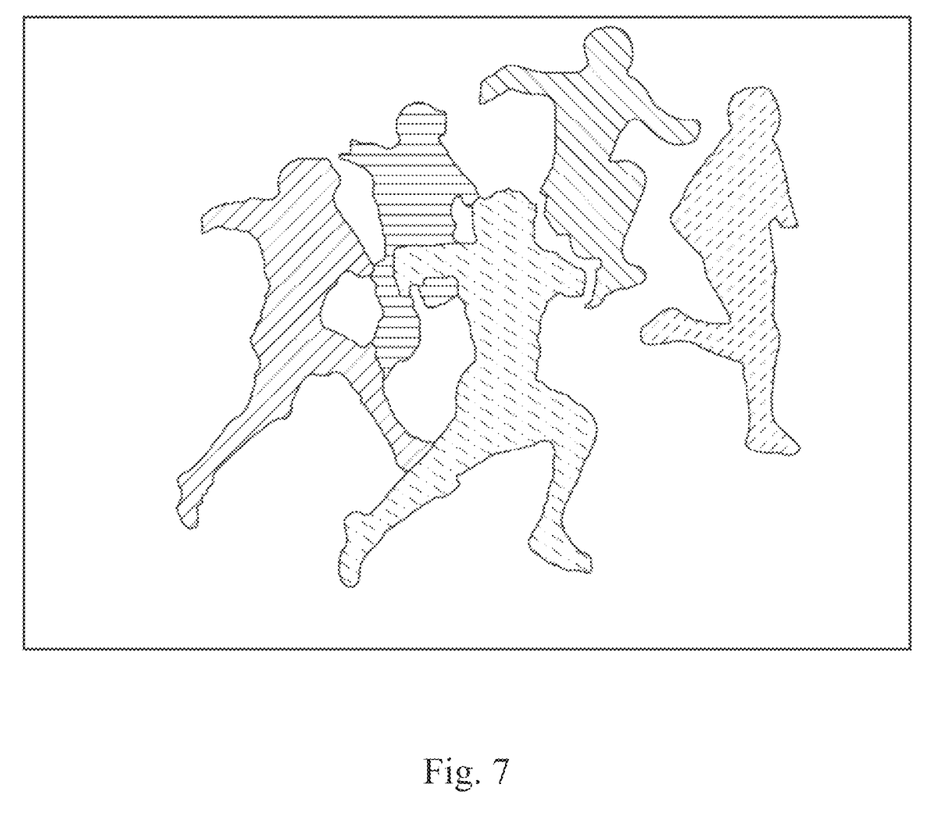
FIG. 7 is a map of a region of interest with showing the segmented objects.

Furthermore, after predicting the object instances in the raw data, the post-processing engine 70 may further enhance the results prior to generating the output data in some examples. For example, the post-processing engine 70 may apply a geodesic dilation using the segmentation map as a mask to fill in pixels that have not been associated with an object. Accordingly, when operating only on the region 305, the post-processing engine 70 may generate a map identifying different object instances in the region 305 as shown in FIG. 7.

Figure 8:
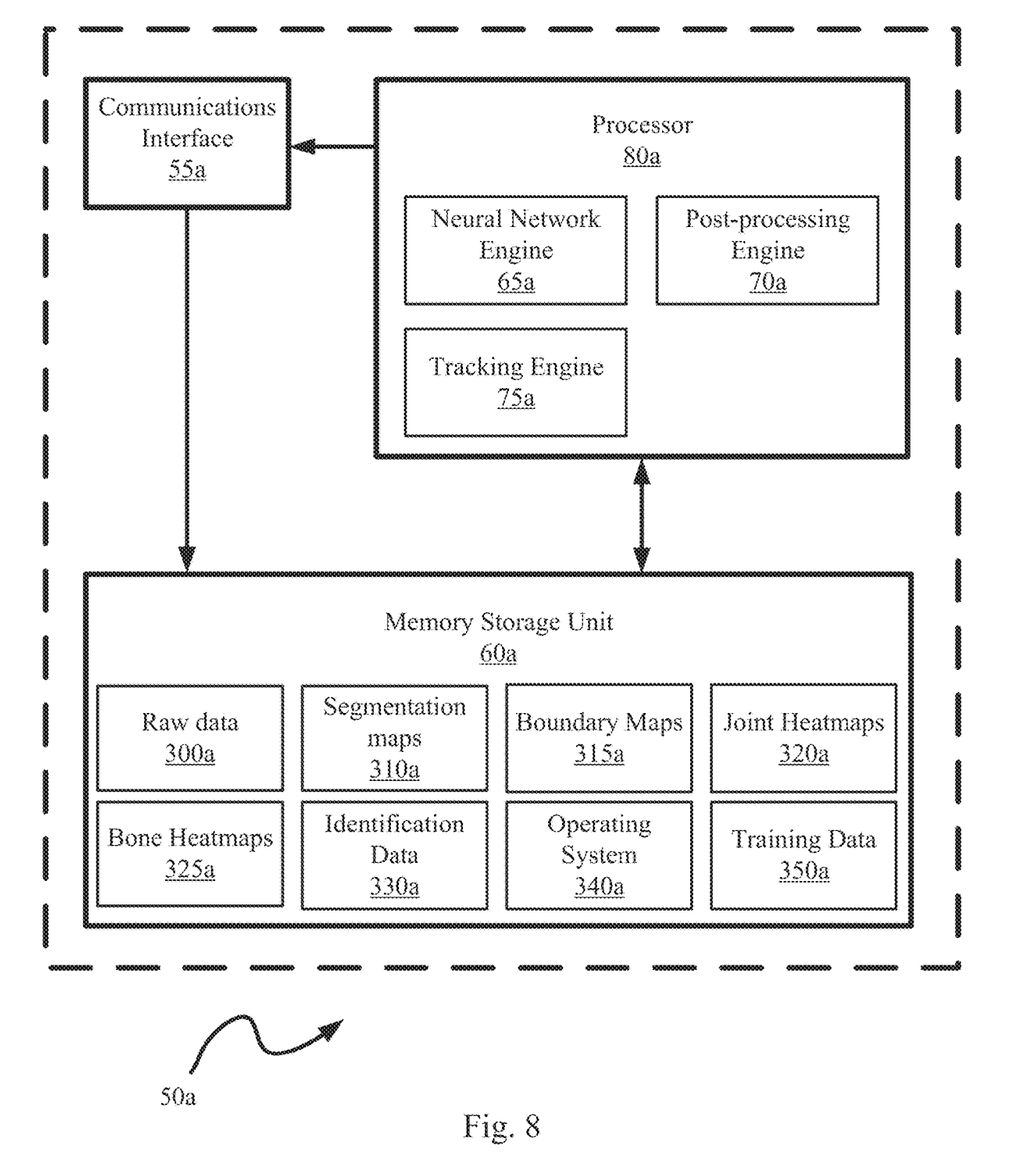
FIG. 8 is a schematic representation of the components of another example apparatus to generate object instance segmentations based on fragment clustering and rediscovery.

Referring to FIG. 8, another schematic representation of an apparatus 50a to generate object instance segmentation in complex images based on fragment clustering and rediscovery is generally shown. Like components of the apparatus 50a bear like reference to their counterparts in the apparatus 50, except followed by the suffix "a". In the present example, the apparatus 50a includes a communications interface 55a, a memory storage unit 60a, and a processor 80a. The processor 80a operates a neural network engine 65a, a post-processing engine 70a, and a tracking engine 75a.

In the present example, the memory storage unit 60a may also maintain databases to store various data used by the apparatus 50a. For example, the memory storage unit 60a may include a database 300a to store raw data images as received from the communications interface 55a, a database 310a to store the segmentation maps generated by the neural network engine 65a, a database 315a to store the boundary maps generated by the neural network engine 65a, a database 320a to store the joint heatmaps generated by the neural network engine 65a, a database 325a to store the bone heatmaps generated by the neural network engine 65a, and a database 330a to store the identification data generated by the post processing engine 70a, which identifies the objects in the raw data. In addition, the memory storage unit may include an operating system 340a that is executable by the processor 80a to provide general functionality to the apparatus 50a. Furthermore, the memory storage unit 60a may be encoded with codes to direct the processor 80a to carry out specific steps to perform a method described in more detail below. The memory storage unit 60a may also store instructions to carry out operations at the driver level as well as other hardware drivers to communicate with other components and peripheral devices of the apparatus 50a, such as various user interfaces to receive input or provide output.

The memory storage unit 60a may also include a synthetic training database 350a to store training data for training the neural network engine 65a. It is to be appreciated that although the present example stores the training database 350a locally, other examples may store the training data externally, such as in a file server or cloud which may be accessed during the training of the neural network via the communications interface 55a.

In the present example, the processor further operates a tracking engine 75a to track the objects identified in the raw data. It is to be appreciated by a person of skill that the raw data may include a plurality of images, where each image represents a frame of a video. Accordingly, objects may move within an image relative to the other objects and position within the image. In addition, the tracking engine 75a may track objects as they leave the frame of the video and reenter the frame of the video. In the present example, the tracking engine 75a may operate another neural network applying an appearance model based on the output data from the post processing engine 70a.

Figure 9:
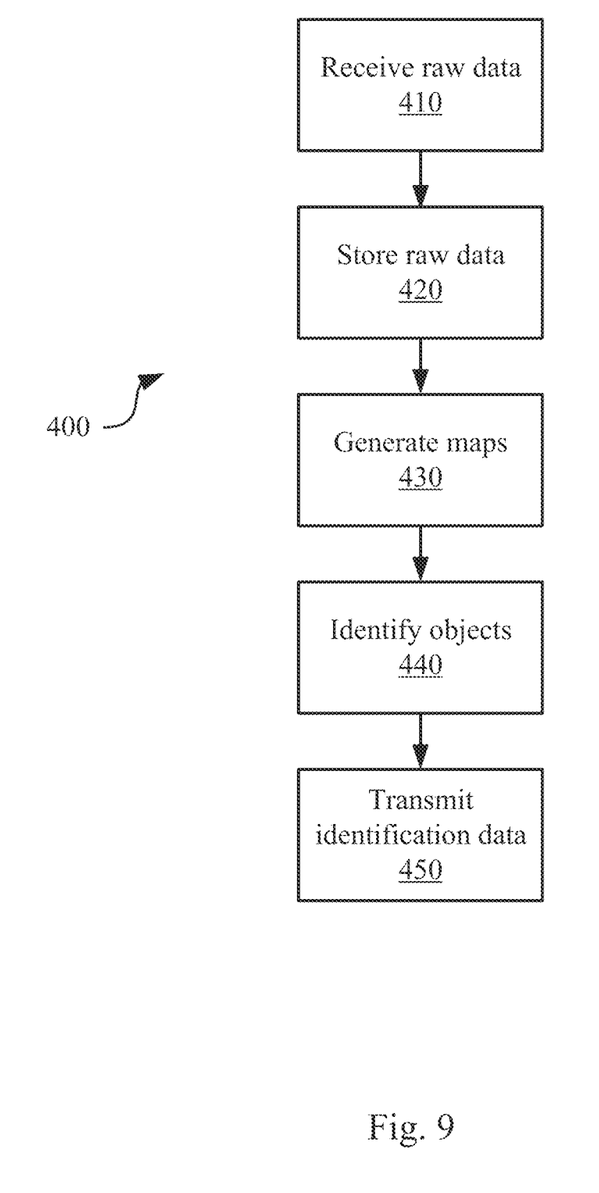
FIG. 9 is a flowchart of an example of a method of generating object instance segmentations based on fragment clustering and rediscovery.

Referring to FIG. 9, a flowchart of an example method of generating object instance segmentation in complex images based on fragment clustering and rediscovery is generally shown at 400. In order to assist in the explanation of method 400, it will be assumed that method 400 may be performed by the apparatus 50. Indeed, the method 400 may be one way in which the apparatus 50 may be configured. Furthermore, the following discussion of method 400 may lead to a further understanding of the apparatus 50 and it components. In addition, it is to be emphasized, that method 400 may not be performed in the exact sequence as shown, and various blocks may be performed in parallel rather than in sequence, or in a different sequence altogether.

Beginning at block 410, the apparatus 50 receives raw data from an external source via the communications interface 55. In the present example, the raw data includes a representation of multiple objects in an image. In particular, the raw data represent multiple humans with various occlusion patterns. The manner by which the objects are represented and the exact format of the two-dimensional image is not particularly limited. For example, the two-dimensional image is received in an RGB format. In other examples, the two-dimensional image be in a different format, such as a raster graphic file or a compressed image file captured and processed by a camera. Once received at the apparatus 50, the raw data is to be stored in the memory storage unit 60 at block 420.

Block 430 involves generating maps with the neural network engine 65. In the present example, the neural network engine 65 generates a segmentation map and a boundary map of the objects in the image. The manner by which the segmentation map is generated is not particularly limited and may include applying a computer vision-based human pose and segmentation system such as the wrnchAI engine. In other examples, other types of computer vision-based human segmentation systems may be used such as OpenPose, Mask-R CNN, or other depth sensor, stereo camera or LIDAR-based human segmentation systems such as Microsoft Kinect or Intel RealSense. In addition, the segmentation map may be annotated by hand with an appropriate software such as CVAT or in a semi-automated way with segmentation assistance tools such as those in Adobe Photoshop or GIMP.

The manner by which the boundary map is generated is also not particularly limited and may use various image processing techniques. In the present example, the segmentation map may also provide input to select parameters to be used by the post-processing engine 70 to refine the boundary map. In particular, the parameters are selected to provide closed boundaries with thin lines.

Next, block 440 comprises identifying the objects in the image received at block 410. In the present example, the post-processing engine 70 uses input from the maps generated by the neural network engine 65 at block 430. The identification of the objects may be converted to output data which can be transmitted to downstream devices for further processing, such as tracking objects in a video.

Various advantages will not become apparent to a person of skill in the art. In particular, the apparatus 50 or the apparatus 50a may be used to generate object instance segmentations in complex images based on fragment clustering and rediscovery images with heavy occlusion areas using a bottom-up approach by analyzing the whole image instead of carrying out an identification for each person. The apparatus 50 may be used for many different types of raw data with different features and complexities by changing the parameters of the post-processing engine accordingly. In addition, the apparatus 50 is capable of detecting various fragments of objects and specifically can detect missing fragments to reconnect them with the object.

It should be recognized that features and aspects of the various examples provided above may be combined into further examples that also fall within the scope of the present disclosure.

What is claimed is:

1. An apparatus comprising:
   a communications interface at which to receive raw data that includes a representation of a first object and a second object;
   a memory storage unit in which to store the raw data;
   a neural network engine configured to:
      receive the raw data, and
      generate, based on the raw data,
         (i) a segmentation map that indicates whether each pixel is part of the first object or the second object, and
         (ii) a boundary map that divides the first object from the second object; and
   a post-processing engine configured to:
      identify, based on the segmentation map and the boundary map, fragments of the first object and the second object that arise from occlusions between the first and second objects, and
      select a first group of the fragments for the first object and a second group of the fragments for the second object by—
         using a bone heatmap to identify connections between the fragments,
         using a joint heatmap to assign a joint type to each of the fragments, and
         clustering, based on the connections and the assigned joint types, the fragments into the first and second groups, such that the first and second objects are associated with no more than a single joint of each type.

2. The apparatus of claim 1, wherein the post-processing engine is further configured to generate a first skeleton of the first object based on the first group of the fragments and a second skeleton of the second object based on the second group of the fragments.

3. The apparatus of claim 1, wherein the raw data is video data, the video data representing movement of the first object and the second object.

4. The apparatus of claim 3, further comprising:
   a tracking engine configured to track the first object and the second object.

5. The apparatus of claim 4, wherein the tracking engine is further configured to track the first object leave and reenter a frame.

6. The apparatus of claim 1, wherein the post-processing engine is further configured to detect for known missing fragments by comparing the first and second groups of the fragments to a map of main fragments.

7. The apparatus of claim 6, wherein the post-processing engine is further configured to output an indication that an object may not have been detected in response to a determination that a fragment is missing.

8. The apparatus of claim 1, wherein the first object is a first human and the second object is a second human.

9. The apparatus of claim 6, wherein the post-processing engine is further configured to adjust parameters to apply to the segmentation map and the boundary map in response to a determination that a fragment is missing.

10. A method comprising:
    receiving, from an image source, raw video data that includes a representation of a first object and a second object;
    storing the raw video data in a memory storage unit;
    generating a segmentation map and a boundary map from the raw video data with a neural network engine;
    identifying, with a post-processing engine based on the segmentation map and the boundary map, fragments of the first object and the second object that arise from occlusions between the first and second objects;
    selecting a first group of the fragments for the first object and a second group of the fragments for the second object using a bone heatmap and/or a joint heatmap, such that the first and second objects are associated with no more than a single bone of each type and/or a single joint of each type; and
    transmitting, via a communications interface, identification information to an external source, wherein the identification information is to identify the first object and the second object in the raw video data.

11. The method of claim 10, wherein further comprising:
    generating a first skeleton of the first object based on the first group of the fragments; and
    generating a second skeleton of the second object based on the second group of the fragments.

12. The method of claim 10, wherein the raw video data represents movement of the first object and second object.

13. The method of claim 12, further comprising:
tracking the first object and the second object with a tracking engine that tracks the first object leave and reenter a frame.

14. A non-transitory computer readable medium encoded with codes, wherein the codes are to direct a processor to:
receive raw video data that includes a representation of movement of a first human and a second human;
store the raw video data in a memory storage unit;
generate a segmentation map and a boundary map from the raw video data;
identify, based on the segmentation map and the boundary map, fragments of the first human and the second human;
select a first group of the fragments for the first human and generate, based on the first group of the fragments, a first skeleton of the first human;
select a second group of the fragments for the second human and generate, based on the second group of the fragments, a second skeleton of the second human;
wherein the first and second groups of the fragments are selected using a bone heatmap and a joint heatmap, so as to ensure that the first and second humans are associated with no more than a single bone of each type and a single joint of each type; and
transmit, to a destination, identification information that identifies the first human and the second human in the segmentation map.

15. The non-transitory computer readable medium of claim 14, wherein the bone heatmap is used to identify connections between the fragments, in order to select the first and second groups of the fragments, and wherein the joint heatmap is used to assign a joint type to each of the fragments.

16. The non-transitory computer readable medium of claim 15, wherein said selecting the first and second groups of the fragments is accomplished by clustering the fragments into the first and second groups based on the connections identified by the bone heatmap and then assigning any remaining fragments based on the assigned joint types, such that there are no common joint types in the first and second groups.

* * * * *